United States Patent
Johnson

[11] Patent Number: 5,921,204
[45] Date of Patent: Jul. 13, 1999

[54] POSITIONABLE AND EXPANDABLE TUBE SYSTEM

[76] Inventor: Gregory G. Johnson, 3417 Longfellow Ave. S., Minneapolis, Minn. 55407

[21] Appl. No.: 08/823,614

[22] Filed: Mar. 25, 1997

[51] Int. Cl.⁶ .................................................. A01K 1/00
[52] U.S. Cl. ........................ 119/452; 119/416; 119/702; 285/261
[58] Field of Search ..................... 119/416, 417, 119/452, 421, 702; 285/261, 298; 482/35

[56] References Cited

U.S. PATENT DOCUMENTS

| | | | |
|---|---|---|---|
| 100,726 | 3/1870 | Coar | 285/261 |
| 536,419 | 3/1895 | Cochrane | 138/120 X |
| 1,528,967 | 3/1925 | Berstad | 138/120 X |
| 3,104,897 | 9/1963 | Berger | 285/166 |
| 3,515,414 | 6/1970 | Kowalewski | 285/261 X |
| 3,695,646 | 10/1972 | Mommsen | 285/261 |
| 4,081,189 | 3/1978 | Dumas | 285/261 X |
| 4,117,535 | 9/1978 | Holt | 362/382 |
| 5,391,014 | 2/1995 | Chen | 285/261 X |
| 5,449,206 | 9/1995 | Lockwood | 285/261 |

FOREIGN PATENT DOCUMENTS

604542  10/1934  Germany ................... 174/111

*Primary Examiner*—Robert P. Swiatek
*Attorney, Agent, or Firm*—Hugh D. Jaeger

[57] ABSTRACT

A positionable and expandable tube system composed of snappingly engageable tube segments for the construction of hamster, gerbil, or like pet tubes. Each tube segment consists of an upper and a lower truncated sphere connected at an annular intersection. The preferred embodiment incorporates an arcuate notch which accommodates the annular intersection in the lower truncated sphere to allow a greater maximum bend angle compared to a tube segment where an arcuate notch is not incorporated. The tube segments, when snappingly engaged, create frictionally positionable ball and socket joints.

21 Claims, 9 Drawing Sheets

POSITIONABLE AND EXPANDABLE TUBE SYSTEM

CROSS REFERENCES TO CO-PENDING APPLICATIONS

None.

BACKGROUND OF THE INVENTION

1. Field of the Invention

The present invention relates to the field of pets; more specifically, pet accessories and toys. The positionable and expandable tube system pertains to a series of snappingly engaged, rotatable segments which snappingly engage using ball and socket-type joints. The tube system may be used for pets such as hamsters, gerbils, rats and the like.

2. Description of the Prior Art

The prior art in the field of pet accessories used rigidly connected segments of brittle tubing and separate connectors which have limited positionability. With the currently available tube components, the user must incorporate multiple tube segments and connectors to create an angled pathway, whereas the present invention provides for multiple positioning without connectors, using a plurality of like tube segments.

SUMMARY OF THE INVENTION

The general purpose of the present invention is to provide a pet accessory tube system having positionable and expandable tube system segments which are snappingly engaged utilizing ball and socket joints.

According to one embodiment of the present invention, there are provided tube segments, each including an upper and lower truncated sphere, an upper and lower annular surface, an annular intersection and an arcuate notch. The notch provides for ease of twisting and/or snapping the tube segments together. There can also be provided large and small connectors which can be used to link the tube system to pet accessories currently on the market.

One significant aspect and feature of the present invention is the flexibility of the tube system provided by the ball and socket joints.

Another significant aspect and feature of the present invention is the beveled annular surface which prevents gnawing by animals using the tube system and which provides smooth interconnection between coupled tube segments.

A further significant aspect and feature of the present invention is the option of having clear or multi-colored tube segments.

Additional significant aspects and features of the present invention are built-in connectors for connecting the tube system to conventional components.

Still another significant aspect and feature of the present invention is the arcuate notch of the tube segments which maximizes the bend angle and facilitates interconnection.

Yet another significant aspect and feature of the present invention is the snapping engagement of the tube segments which requires no special tools.

Having thus set forth significant aspects and features of the present invention, it is the principal object of the present invention to provide a positionable and expandable pet tube system.

One object of the present invention is to provide a versatile tube system for use in hamster, gerbil or other small pet animal habitats that is capable of being configured to create an aesthetically pleasing passageway which can be easily altered to change the appearance and arrangement of the animal habitat.

Another object of the present invention is to provide a tube system for animal habitats which is constructed of easily assembled parts that can be quickly erected in a variety of shapes and can be readily dismantled for cleaning, all without the need for tools.

A further object of the present invention is the provision of a tube system which maintains its position and configuration by frictional engagement of its component parts.

An additional object of the present invention is the provision of a tube system in which a minimum of condensation takes place in the interior thereof and in which ample oxygen is present for animals within the tube system.

A still further object of the present invention is to provide a tube system formed of interconnected segments wherein the internal surface is smooth and free of surfaces which can be gnawed by animals using the same.

These and other objects of the present invention are fulfilled by the tube system next described in detail.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
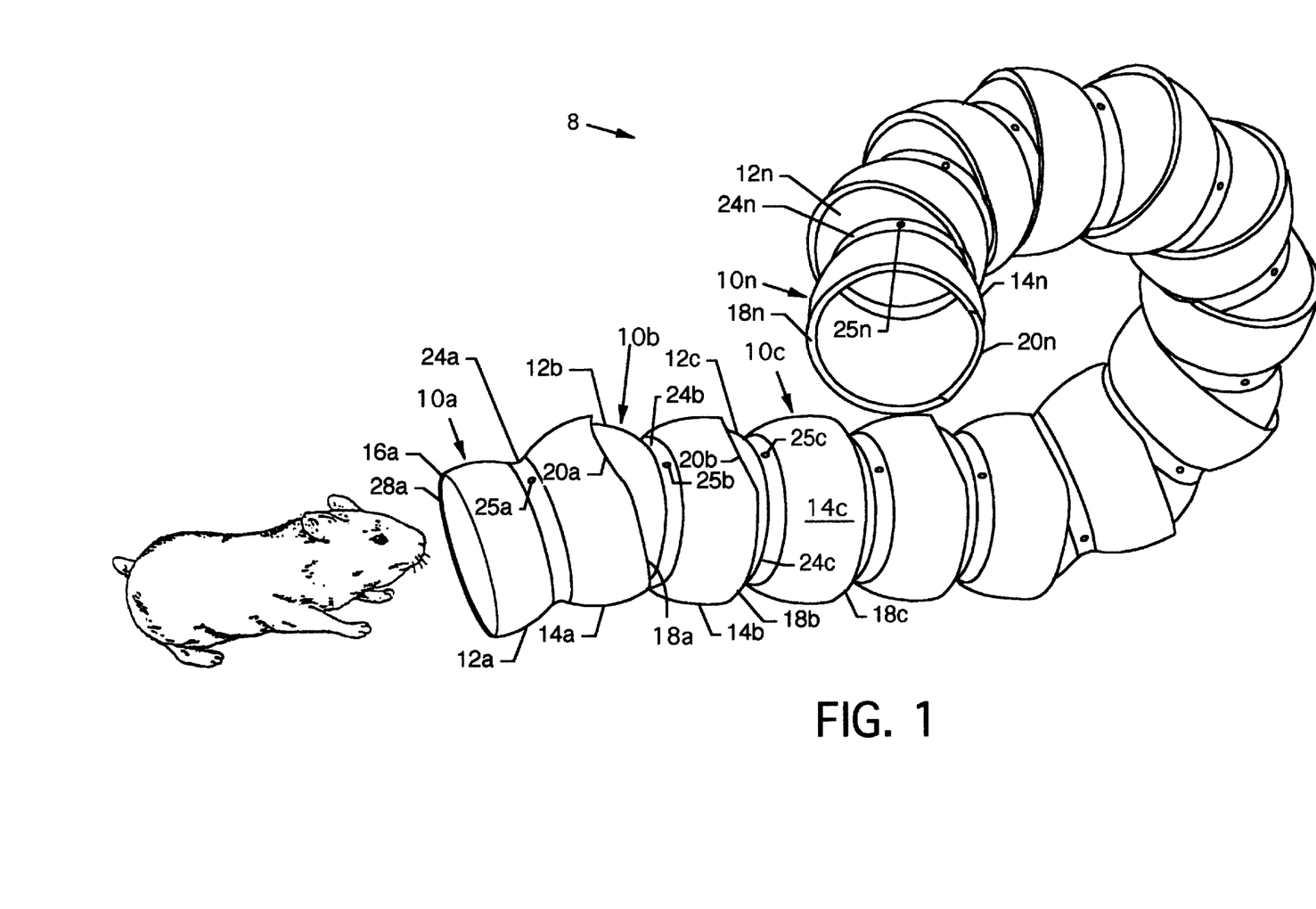
FIG. 1 illustrates a perspective view of a positionable and expandable tube system composed of interconnected tube segments, the present invention.

FIG. 1 illustrates a perspective view of a positionable and expandable tube system 8 comprised of a plurality of tube segments 10a–10n which are snappingly engaged in an end-to-end fashion utilizing ball and socket joints. The tube segments are constructed of a thermal plastic such as ABS, SAN, polycarbonate or other appropriate material which is durable, flexible and can be produced in transparent or multi-colored versions. Any suitable polymer material is appropriate for each of the tube segments.

Figure 2:
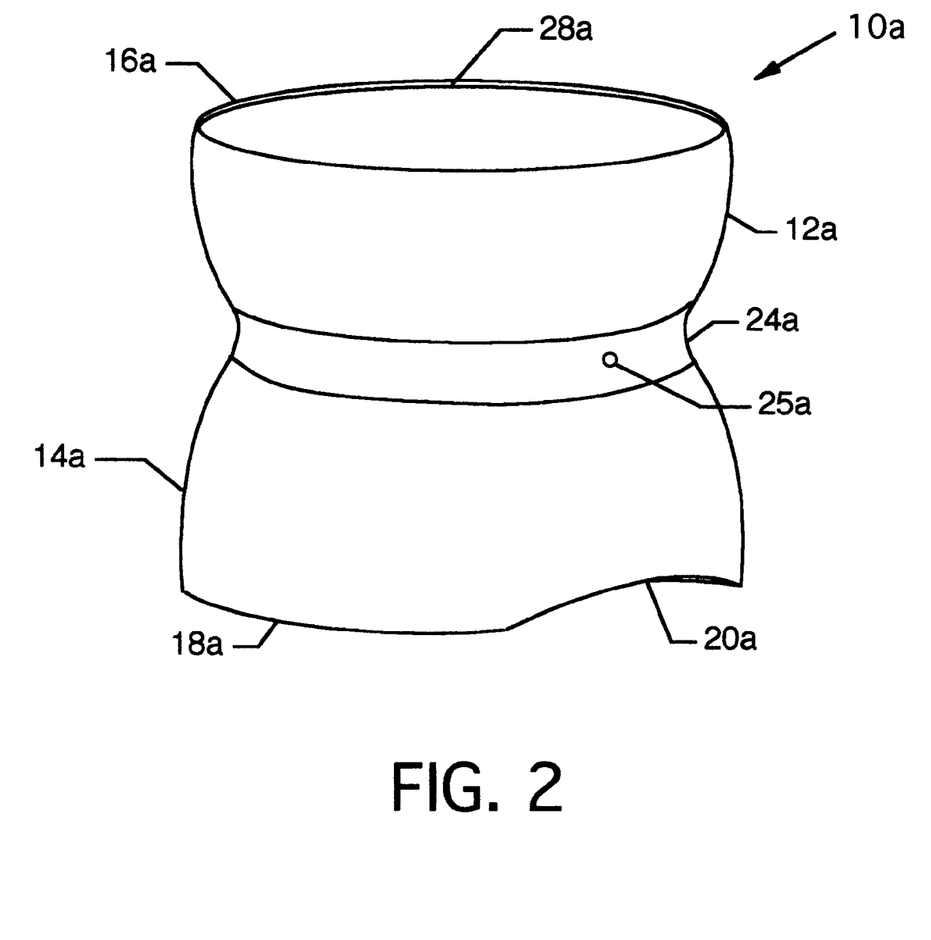
FIG. 2 illustrates a perspective view of a tube segment having an arcuate notch.

FIG. 2 illustrates a perspective view of tube segment 10a, where all numerals correspond to those elements previously described. Tube segments 10a–10n are all identical in construction and design and have an hour-glass configuration. Tube segment 10a is now described. Tube segment 10a consists of an upper truncated sphere or bulbous end portion 12a and a lower truncated sphere or bulbous end portion 14a suitably connected at annular intersection or narrow, hollow, annular, waist section or narrowed mid section 24a where the upper annular surface or peripheral end edge 16a of the upper truncated sphere or bulbous end portion 12a has a slightly smaller radius than the lower annular surface 18a of the lower truncated sphere or bulbous end portion 14a. The lower truncated sphere or bulbous end portion 14a incorporates an arcuate notch 20a in the lower annular surface or peripheral end edge 18a. The purpose of the arcuate notch 20a will be explained in conjunction with FIG. 5. Also provided at the annular intersection or narrow, hollow, annular, waist section or narrowed mid section 24a is an air hole 25a which prevents condensation in the tube system and allows entry of the oxygen which the hamster, gerbil, or other animal needs to live. The air hole is not essential but is preferred. Of course, several air holes rather than a single air hole could be provided in the annular intersection, if desired.

Figure 3:
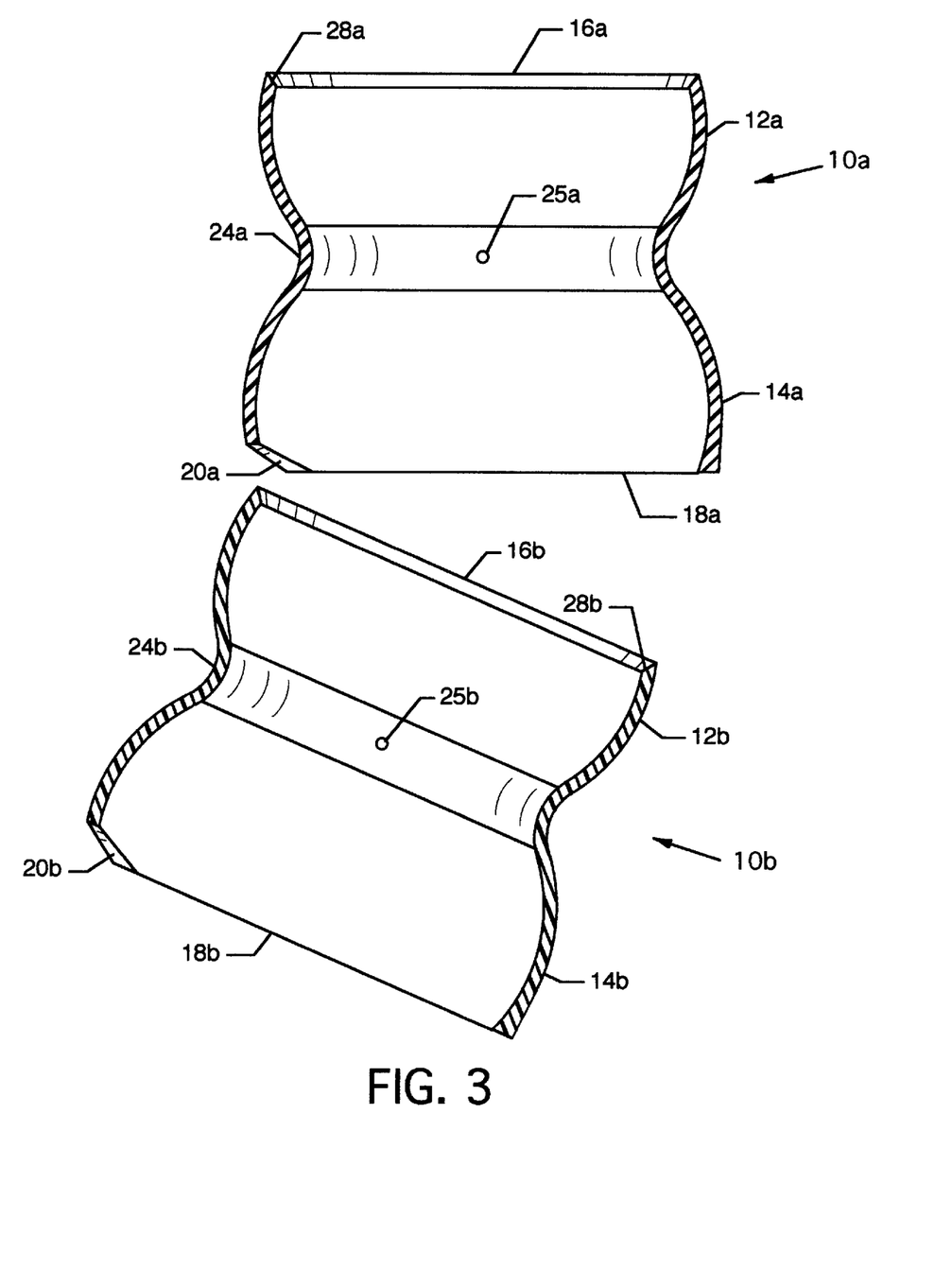
FIG. 3 illustrates a cross sectional side view of two tube segments aligned for interconnection.

FIG. 3 illustrates a cross sectional side view of two tube segments 10a and 10b aligned for interconnection, where all numerals correspond to those elements previously described. Specifically shown in this figure is the alignment of upper truncated sphere or bulbous end portion 12b with relation to lower truncated sphere or bulbous end portion 14a. Annular bevels 28a and 28b on upper annular surfaces or peripheral end edges 16a and 16b, respectively, provide for smooth interior engagement between tube segments 10a and 10b, which prevents gnawing by hamsters, gerbils and the like. Arcuate notch 20a accommodates easy snapping engagement of tube segments 10a and 10b. Also illustrated is the radial difference of upper annular surface or peripheral end edge 16b compared to the lower annular surface or peripheral end edge 18a. This radial difference is further illustrated in FIG. 4.

Figure 4:
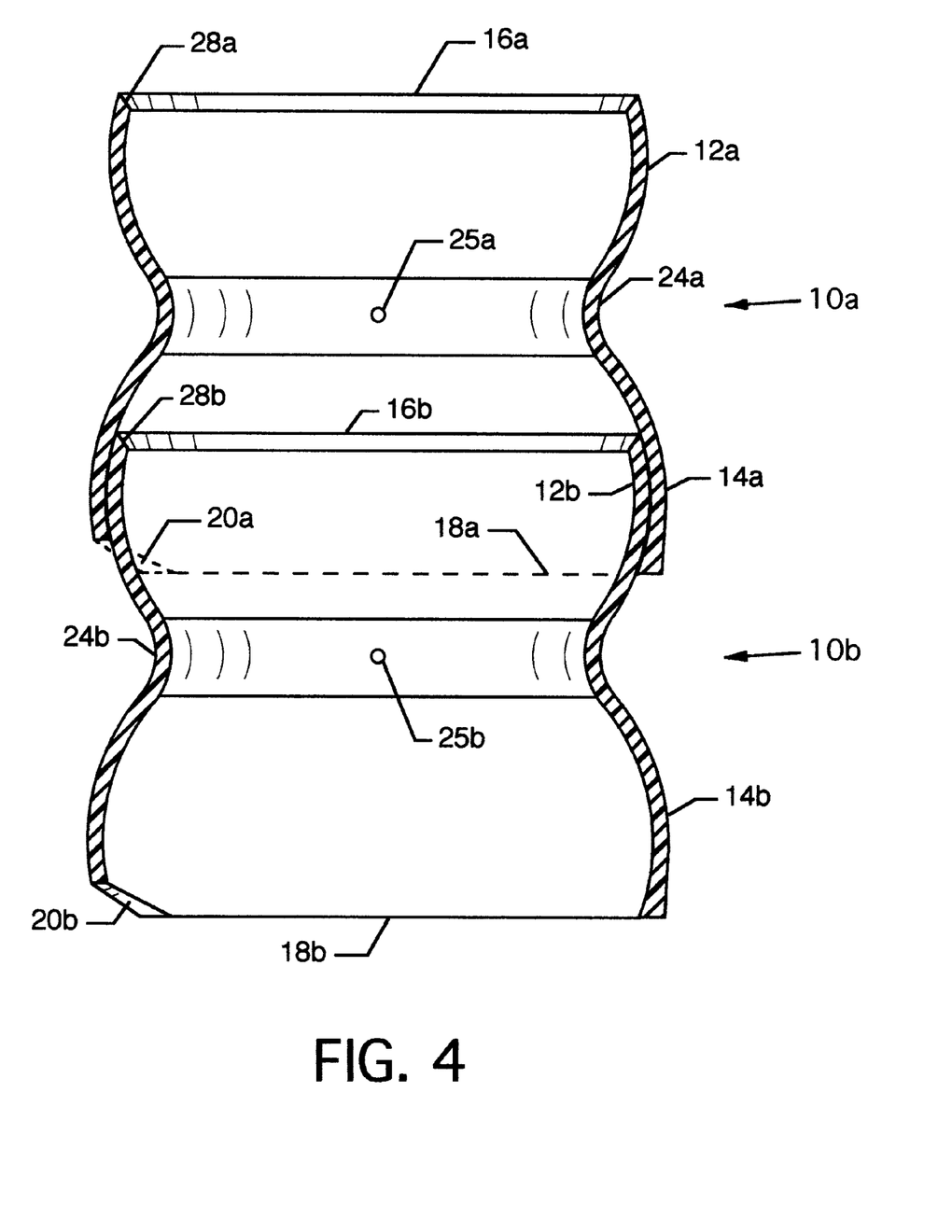
FIG. 4 illustrates a cross sectional side view of two tube segments vertically interconnected.

FIG. 4 illustrates a cross sectional side view of tube segments 10a and 10b vertically interconnected, where all numerals correspond to those elements previously described. Illustrated in detail is the slight radial difference of the upper annular surface or peripheral end edge 16b compared to the lower annular surface or peripheral end edge 18a which results in the interconnection of tube segments 10a and 10b completing a frictionally engaged ball and socket joint.

Mode of Operation

Figure 5:
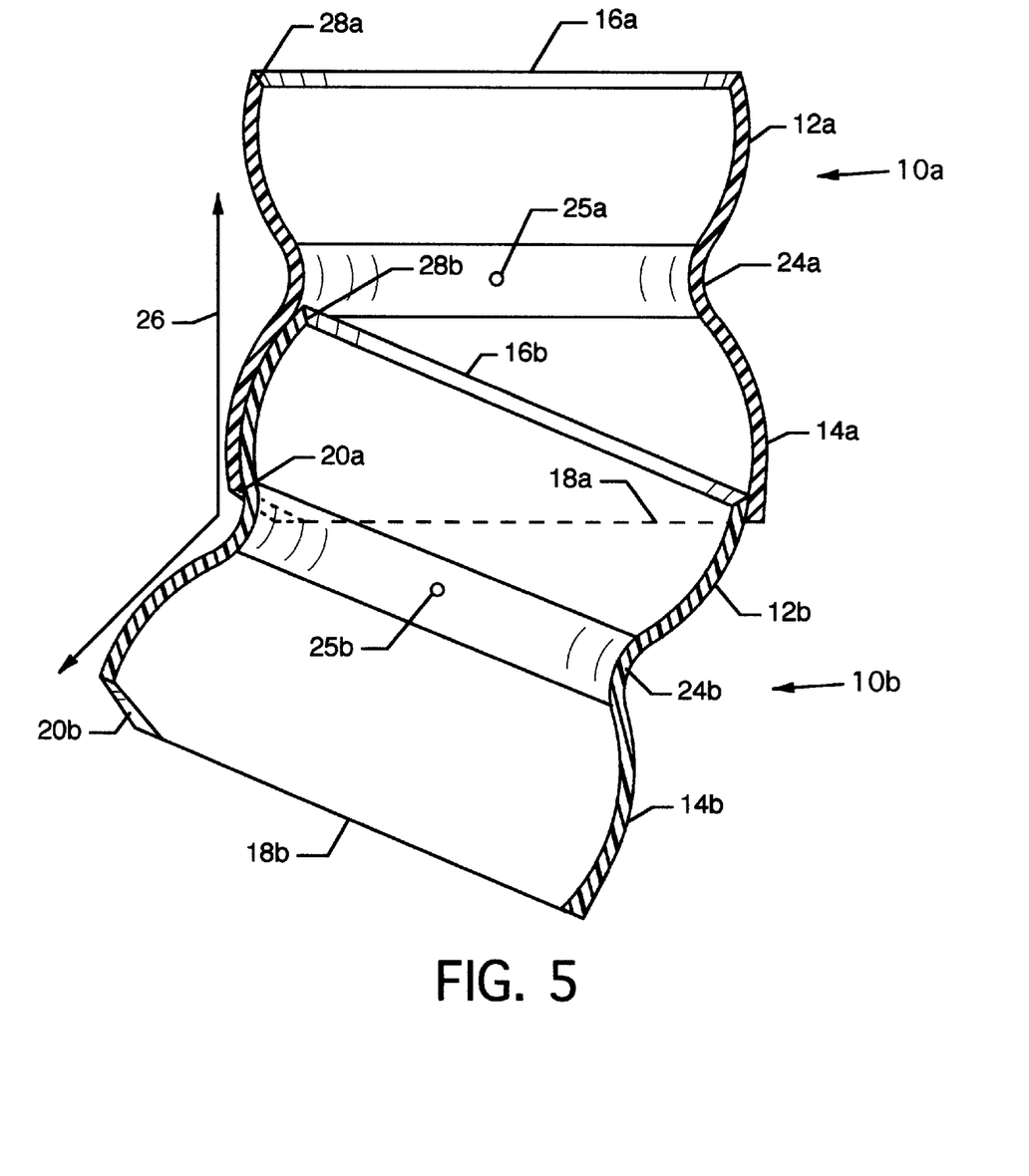
FIG. 5 illustrates a cross sectional side view of two tube segments interconnected and positioned at the maximum allowable angle.

FIG. 5 illustrates a cross sectional side view of tube segments 10a and 10b snappingly engaged and positioned at the maximum allowable angle 26. Angle 26 is maximized by arcuate notch 20a. If arcuate notch 20a were not incorporated in lower annular surface or peripheral end edge 18a, lower annular surface or peripheral end edge 18a would lessen the angle of the tube system bend by contacting annular intersection or narrow, hollow, annular, waist section or narrowed mid section 24b. As illustrated in FIG. 1, a plurality of tube segments 10a–10n may be snappingly engaged in an end-to-end fashion, creating unlimited expansion of the positionable and expandable tube system 8. The ball and socket joints created by the intersection of tube segments 10a–10n allow the user to rotationally position the tubing segments 10a10n in any number of various positions.

First Alternative Embodiment

Figure 6:
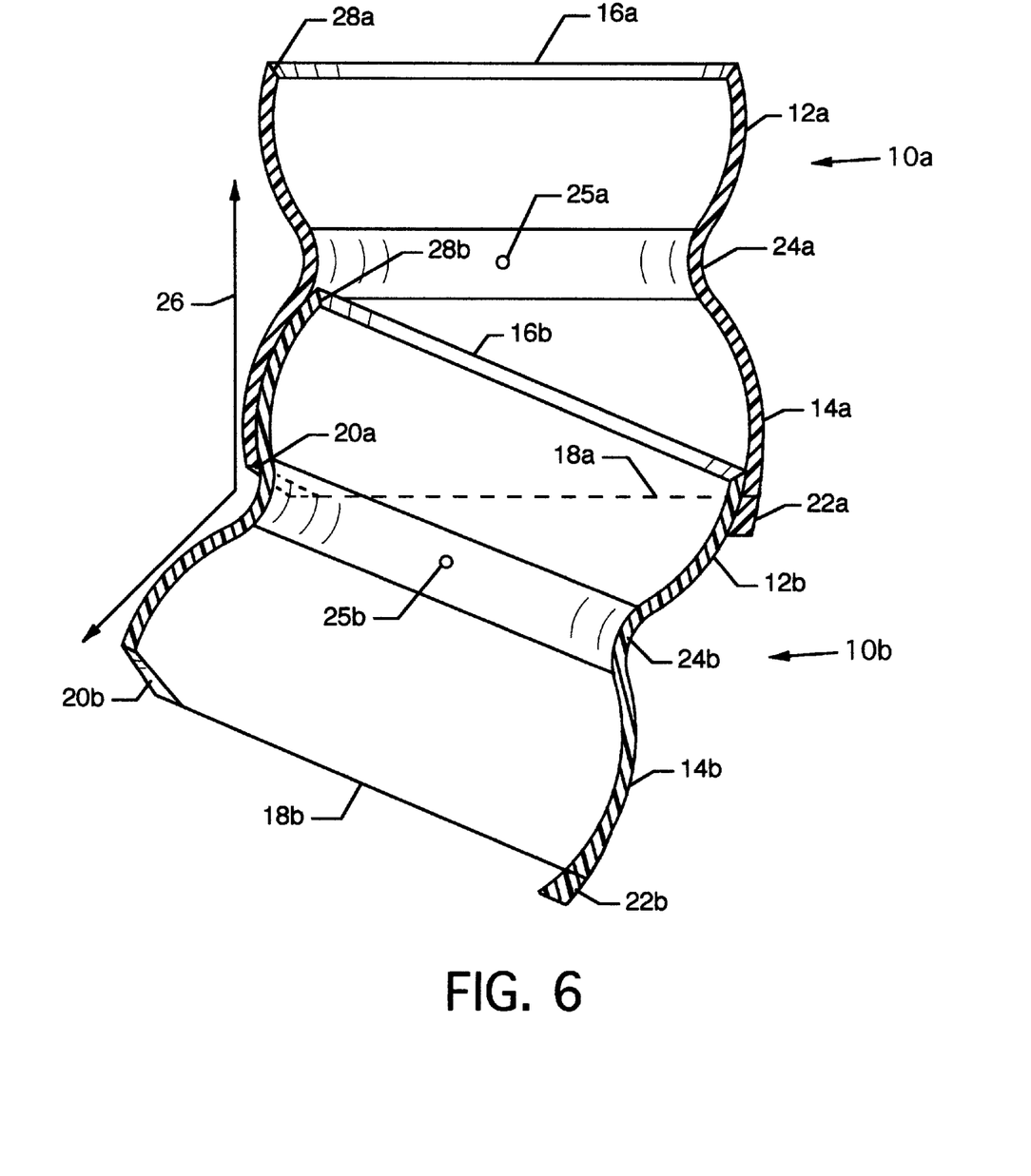
FIG. 6 illustrates a cross sectional side view of two tube segments interconnected and positioned at the maximum allowable angle using an arcuate node to prevent separation, the first alternative embodiment.

FIG. 6 illustrates the first alternative embodiment in a cross sectional side view of two tube segments 10a and 10b interconnected and positioned at the maximum allowable angle 26 using an arcuate node to prevent separation. Illustrated in detail is arcuate node 22a which captures upper truncated sphere or bulbous end portion 12b and prevents tube segment 10b from detaching from tube segment 10a when positioned at angle 26, which is the maximum allowable angle. Also illustrated in this figure is the smooth interior interconnection between tube segments 10a and 10b created by annular bevel 28b. The smooth interior surface interconnection produced by the annular bevel not only creates a continuous smooth surface for traversing by animals but also eliminates projecting surface portions which can be gnawed by the animals. In addition, it reduces the areas which will capture dirt, thus aiding to keep the interior passageway clean.

Second Alternative Embodiment

Figure 7:
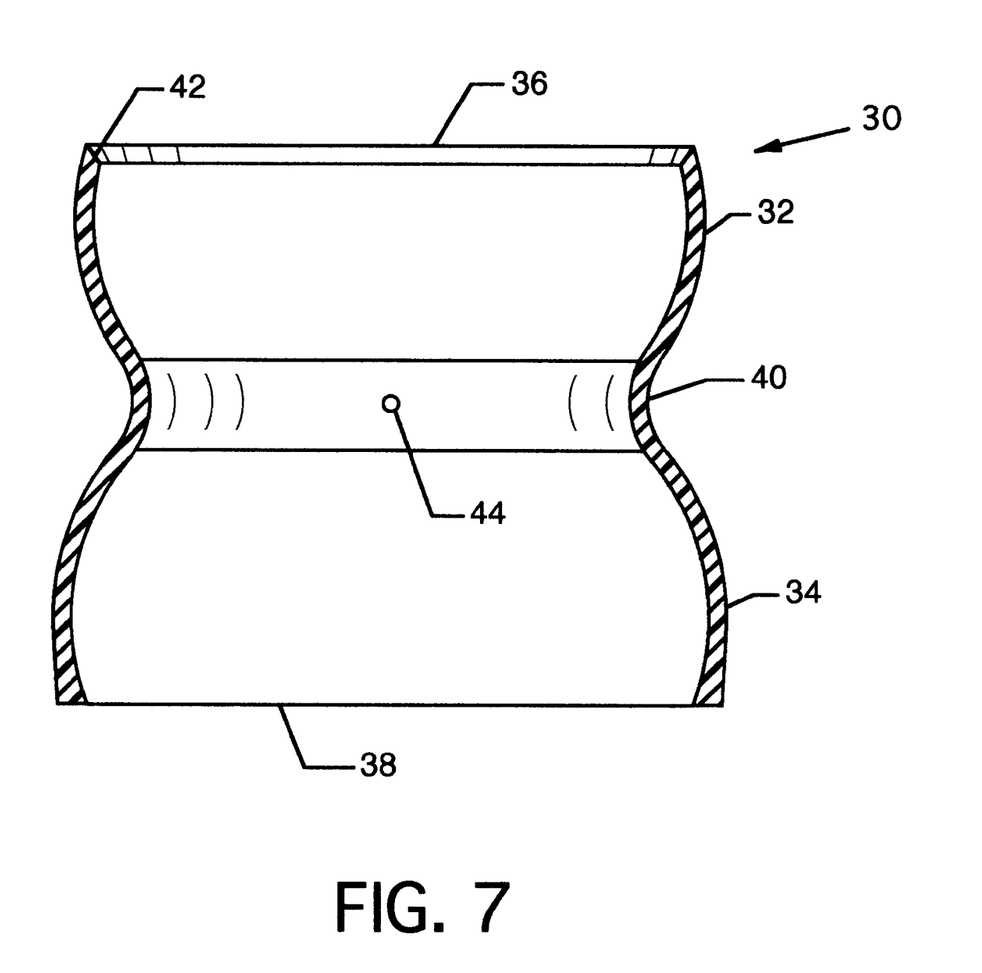
FIG. 7 illustrates a cross sectional side view of a tube segment without an arcuate notch, the second alternative embodiment.

FIG. 7 illustrates a cross sectional side view of a tube segment 30 without an arcuate notch 20a–20n or an arcuate node 22a–22n as shown in the previous figures. This second alternative embodiment is constructed and designed using the same principles taught in the preferred embodiment having upper and lower truncated spheres or bulbous end portions 32 and 34, upper and lower annular surfaces or peripheral end edges 36 and 38, an annular intersection or narrow, hollow, annular, waist section or narrowed mid section 40, an air hole 44 and an annular bevel 42. The lack of an arcuate notch 20a–20n and/or an arcuate node 22a–22n limits the maximum angle of adjustability of the tube.

Figure 8:
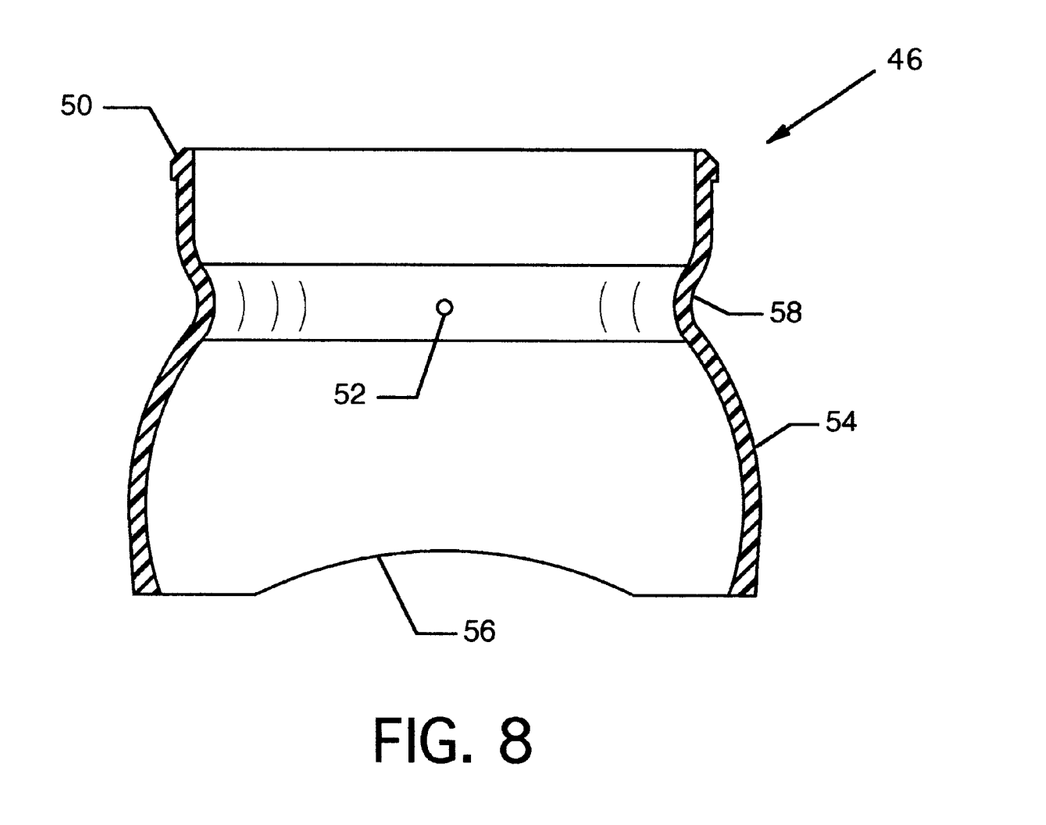
FIG. 8 illustrates a cross sectional side view of a large connector for use in connecting the tube system to conventional components; and, FIG. 9 illustrates a cross sectional side view of an small connector for use in connecting the tube system to conventional components.

FIG. 8 illustrates a cross sectional side view of a large connector 46 for use in connecting the tube system to conventional components. The large connector 46 is comprised of a truncated sphere or bulbous end portion 54, an annular intersection or narrow, hollow, annular, waist section or narrowed mid section 58, an air hole 52, an arcuate notch 56 and an annular lip 50. The upper truncated spheres or bulbous end portions 12a–12n of tube segments 10a–10n described in the preferred and alternative embodiments snappingly engage the interior area of truncated sphere or bulbous end portion 54 forming a ball and socket joint. The annular lip 50 is constructed to snappingly engage any number of conventional tubing connectors and hamster habitat accessories on the market today.

Figure 9:
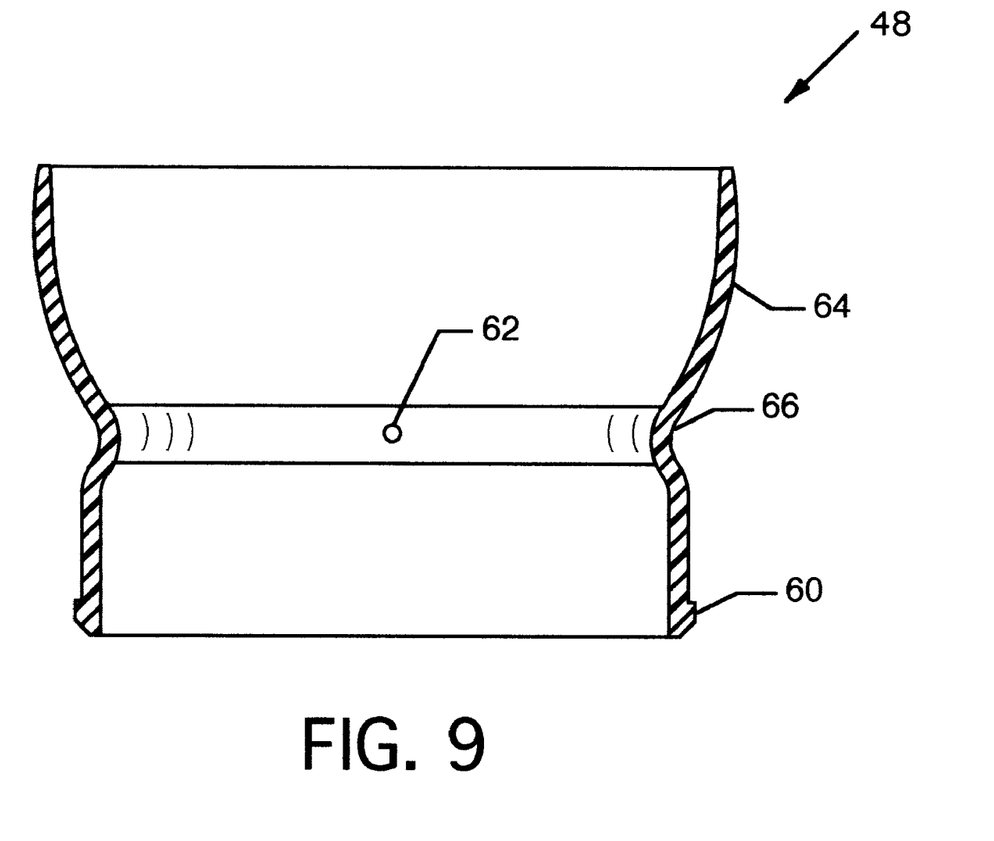

FIG. 9 illustrates a cross sectional side view of a small connector 48 for use in connecting the tube system to conventional components. The small connector 48 is comprised of a truncated sphere or bulbous end portion 64, an air hole 62, an annular intersection or narrow, hollow, annular, waist section or narrowed mid section 66 and an annular lip 60. The truncated sphere or bulbous end portion 64 snappingly engages the interior of lower truncated spheres or bulbous end portions 14a14n, described previously, forming a ball and socket joint. The annular lip 60 is constructed to snappingly engage any number of conventional tubing connectors and hamster accessories on the market today. The combination of large and small connectors 46 and 48 provides a new alternative hamster tubing system which expands and updates the owner's current system and can be utilized with conventional hamster tubing components on the market.

Various modifications can be made to the present invention without departing from the apparent scope hereof.

I claim:

1. A tube segment for use with other identical tube segments to create a tube system for pets, the tube segment comprising:
   a. a first hollow truncated sphere having an outer surface and an inner surface;
   b. a second hollow truncated sphere having an outer surface and an inner surface;
   c. the radius of curvature of said inner surface of said second hollow truncated sphere being slightly greater than the radius of curvature of said outer surface of said first hollow truncated sphere;
   d. a narrow, hollow, annular waist section having a concave outer surface and a convex inner surface;
   e. said first and second hollow truncated spheres being joined together by said narrow, hollow, annular waist section with said outer surfaces of said first and second hollow truncated spheres merging smoothly with said outer concave surface of said narrow, hollow, annular waist section and said inner surfaces of said first and second hollow truncated spheres merging smoothly with said inner convex surface of said narrow, hollow, annular waist section, thereby forming a tubular element of hour-glass configuration having said first hollow truncated sphere as one end portion thereof, said second hollow truncated sphere as the other end portion thereof, and said narrow, hollow, annular waist section as the mid section thereof;
   f. said first and second hollow truncated spheres each terminating in an annular peripheral end edge remote from said narrow, hollow, annular waist section; and,
   g. said annular peripheral end edge of said second hollow truncated sphere having an arcuate notch formed therein.

2. The tube segment as defined in claim 1, wherein said first hollow truncated sphere, said second hollow truncated sphere, and said narrow, hollow, annular waist section all have uniform and identical wall thicknesses.

3. The tube segment as defined in claim 1, wherein said first hollow truncated sphere, said second hollow truncated sphere, and said narrow, hollow, annular waist section are formed as a unitary, one-piece construction.

4. The tube segment as defined in claim 1, wherein the entire tube segment is formed in one piece out of a plastic material.

5. The tube segment as defined in claim 1, wherein said narrow, hollow, annular waist section has at least one air hole extending therethrough.

6. The tube segment as defined in claim 1, wherein said annular peripheral end edge of said second hollow truncated sphere has an arcuate node protruding therefrom, said arcuate node being positioned circumferentially opposite to said arcuate notch.

7. The tube segment as defined in claim 1, wherein said annular peripheral end edge of said first hollow truncated sphere is beveled outwardly from said inner surface of said first hollow truncated sphere to said outer surface of said first hollow truncated sphere.

8. The tube segment as defined in claim 1, wherein said slightly greater radius of curvature of said inner surface of said second hollow truncated sphere compared to said radius of curvature of said outer surface of said first hollow truncated sphere is so slight that if said first hollow truncated sphere were inserted into said second hollow truncated sphere, said outer surface of said first hollow truncated sphere would frictionally engage said inner surface of said second hollow truncated sphere.

9. A tube segment for use with other identical tube segments to create a tube system for pets, the tube segment comprising: an open-ended, one-piece tubular element of hour-glass configuration having bulbous end portions and a narrowed mid section, each of said bulbous end portions having a curved convex outer wall surface and a curved concave inner wall surface, and said narrowed mid section having a curved concave outer wall surface and a curved convex inner wall surface, said curved concave inner wall surface of one of said bulbous end portions having a radius of curvature that is slightly greater than the radius of curvature of said curved convex outer wall surface of the other one of said bulbous end portions, each of said bulbous end portions terminating in an annular peripheral edge remote from said narrowed mid section, and the annular peripheral edge of the bulbous end portion having the curved concave inner wall surface with a radius of curvature that is slightly greater than the radius of curvature of the curved convex outer wall surface of the other one of said bulbous end portions having an arcuate notch.

10. The tube segment as defined in claim 9, wherein said bulbous end portions and said narrowed mid section all have uniform and identical wall thicknesses.

11. The tube segment as defined in claim 9, wherein said open-ended, one-piece tubular element of hour-glass configuration having bulbous end portions and a narrowed mid section is formed entirely of plastic material.

12. The tube segment as defined in claim 9, wherein said narrowed mid section has at least one air hole extending therethrough.

13. The tube segment as defined in claim 9, wherein said annular peripheral edge having said arcuate notch also has an arcuate node protruding therefrom, said arcuate node being positioned circumferentially opposite to said arcuate notch.

14. The tube segment as defined in claim 9, wherein the annular peripheral edge of said other one of said bulbous end portions is beveled outwardly from said curved concave inner wall surface thereof to said curved convex outer wall surface thereof.

15. A tube system for pets comprising:
   a. a plurality of identical tube segments;
   b. each of said identical tube segments comprising:
      (1) a first hollow truncated sphere having an outer surface and an inner surface;
      (2) a second hollow truncated sphere having an outer surface and an inner surface;
      (3) the radius of curvature of said inner surface of said second hollow truncated sphere being slightly greater than the radius of curvature of said outer surface of said first hollow truncated sphere;
      (4) a narrow, hollow, annular waist section having a concave outer surface and a convex inner surface;
      (5) said first and second hollow truncated spheres being joined together by said narrow, hollow, annular waist section with said outer surfaces of said first and second hollow truncated spheres merging smoothly with said outer concave surface of said narrow, hollow, annular waist section and said inner surfaces of said first and second hollow truncated spheres merging smoothly with said inner convex surface of said narrow, hollow, annular waist section, thereby forming a tubular element of hour-glass configuration having said first hollow truncated sphere as one end portion thereof, said second hollow truncated sphere as the other end portion thereof, and said narrow, hollow, annular waist section as the mid section thereof;

(6) said first and second hollow truncated spheres each terminating in an annular peripheral end edge remote from said narrow, hollow, annular waist section; and, (7) said annular peripheral end edge of said second hollow truncated sphere having an arcuate notch formed therein; and, c. said plurality of identical tube segments being successively engaged with one another, with said outer surface of the first hollow truncated sphere of one tube segment mutually frictionally engaging said slightly greater radius of curvature inner surface of the second hollow truncated sphere of another tube segment, thereby producing a tube system which can be altered in configuration by movement of said identical tube segments with respect to one another about the mutually frictionally engaged surfaces.

16. The tube system as defined in claim 15, wherein said narrow, hollow, annular waist section of each identical tube segment has at least one air hole extending therethrough.

17. The tube system as defined in claim 15, wherein each identical tube segment is a unitary, one-piece construction.

18. The tube system as defined in claim 15, wherein each identical tube segment has a uniform wall thickness throughout.

19. The tube system as defined in claim 15, wherein said annular peripheral end edge of said second hollow truncated sphere having an arcuate notch of each identical tube segment has an arcuate node protruding therefrom, said arcuate node being positioned circumferentially opposite to said arcuate notch.

20. The tube system as defined in claim 15, wherein said annular peripheral end edge of said first hollow truncated sphere of each identical tube segment is beveled outwardly from said inner surface of said first hollow truncated sphere to said outer surface of said first hollow truncated sphere, thereby forming smooth interior surface transitions between the inner surface of each first hollow truncated sphere and the inner surface of each second hollow truncated sphere of the successively engaged identical tube segments.

21. A connector for use in connecting tube components in a tube system for pets, the connector comprising: an open-ended, one-piece tubular element having a first end in the form of a hollow cylinder, a second end in the form of a hollow truncated sphere, and a narrowed, hollow mid section joining said first and second ends, said first and second ends each terminating in an annular peripheral edge remote from said narrowed, hollow mid section, and said annular peripheral edge of said first end having an outwardly extending annular lip, wherein said narrowed, hollow mid section has a concave outer wall surface which merges smoothly with the outer wall surfaces of said hollow cylinder and said hollow truncated sphere, and a convex inner wall surface which merges smoothly with the inner wall surfaces of said hollow cylinder and said hollow truncated sphere.

* * * * *